United States Patent [19]

Suzuki et al.

[11] Patent Number: 5,283,635
[45] Date of Patent: Feb. 1, 1994

[54] WHITE BALANCE ADJUSTING DEVICE WITH PLURAL THRESHOLDS FOR RANGE CONTROL

[75] Inventors: Masao Suzuki; Kunio Ninomiya, both of Kanagawa, Japan

[73] Assignee: Canon Kabushiki Kaisha, Tokyo, Japan

[21] Appl. No.: 711,265

[22] Filed: Jun. 4, 1991

Related U.S. Application Data

[63] Continuation of Ser. No. 359,102, May 31, 1989, abandoned.

[30] Foreign Application Priority Data

Jun. 3, 1988 [JP] Japan ................................. 63-136783
Jul. 19, 1988 [JP] Japan ................................. 63-178101

[51] Int. Cl.⁵ .............................................. H04N 9/73
[52] U.S. Cl. ..................................... 358/516; 343/655
[58] Field of Search ................... 358/29 C, 41, 43, 44, 358/75-80; H04N 9/73

[56] References Cited

U.S. PATENT DOCUMENTS

| | | | |
|---|---|---|---|
| 4,574,303 | 3/1986 | Hashimoto et al. | 358/29 C |
| 4,595,946 | 6/1986 | Uehara et al. | 358/29 C |
| 4,616,253 | 10/1986 | Hashimoto et al. | 358/29 C |
| 4,638,350 | 1/1987 | Kato et al. | 358/29 C |
| 4,646,161 | 2/1987 | Tsuchiya et al. | 358/29 C |
| 4,682,210 | 7/1987 | Ikemura et al. | 358/29 C |
| 4,811,086 | 3/1989 | Hieda | 358/29 C |
| 4,833,525 | 5/1989 | Suzuki et al. | 358/29 C |
| 5,146,316 | 9/1992 | Suzuki | 358/29 |

FOREIGN PATENT DOCUMENTS

| | | | |
|---|---|---|---|
| 60-192485 | 9/1985 | Japan | 358/29 C |
| 0189891 | 8/1987 | Japan | H04N 9/73 C |
| 0237681 | 10/1988 | Japan | H04N 9/73 C |

*Primary Examiner*—Stephen Brinich
*Attorney, Agent, or Firm*—Robin, Blecker, Daley & Driscoll

[57] ABSTRACT

A white balance adjustment device includes an image sensor for converting light of an object into an electrical signal, an amplification circuit for amplifying the electrical signal output from the image sensor, a control voltage limiting circuit for limiting a range of a control voltage to be output to the amplification circuit, and a detection circuit for detecting a quantity of ambient light with a hysteresis characteristic. The limited range of the control voltage is arranged to be variable on the basis of an output of the detection circuit.

11 Claims, 8 Drawing Sheets

WHITE BALANCE ADJUSTING DEVICE WITH PLURAL THRESHOLDS FOR RANGE CONTROL

This is a continuation application under 37 CFR 1.62 of prior application Ser. No. 359,102, filed May 31, 1989, now abandoned.

BACKGROUND OF THE INVENTION

1. Field of the Invention

This invention relates to a white balance adjustment device for a color image sensing apparatus.

2. Description of the Related Art

Among the known color image sensing apparatuses, an automatic tracking type apparatus is arranged to measure colors by means of an external sensor.

Figure 3:
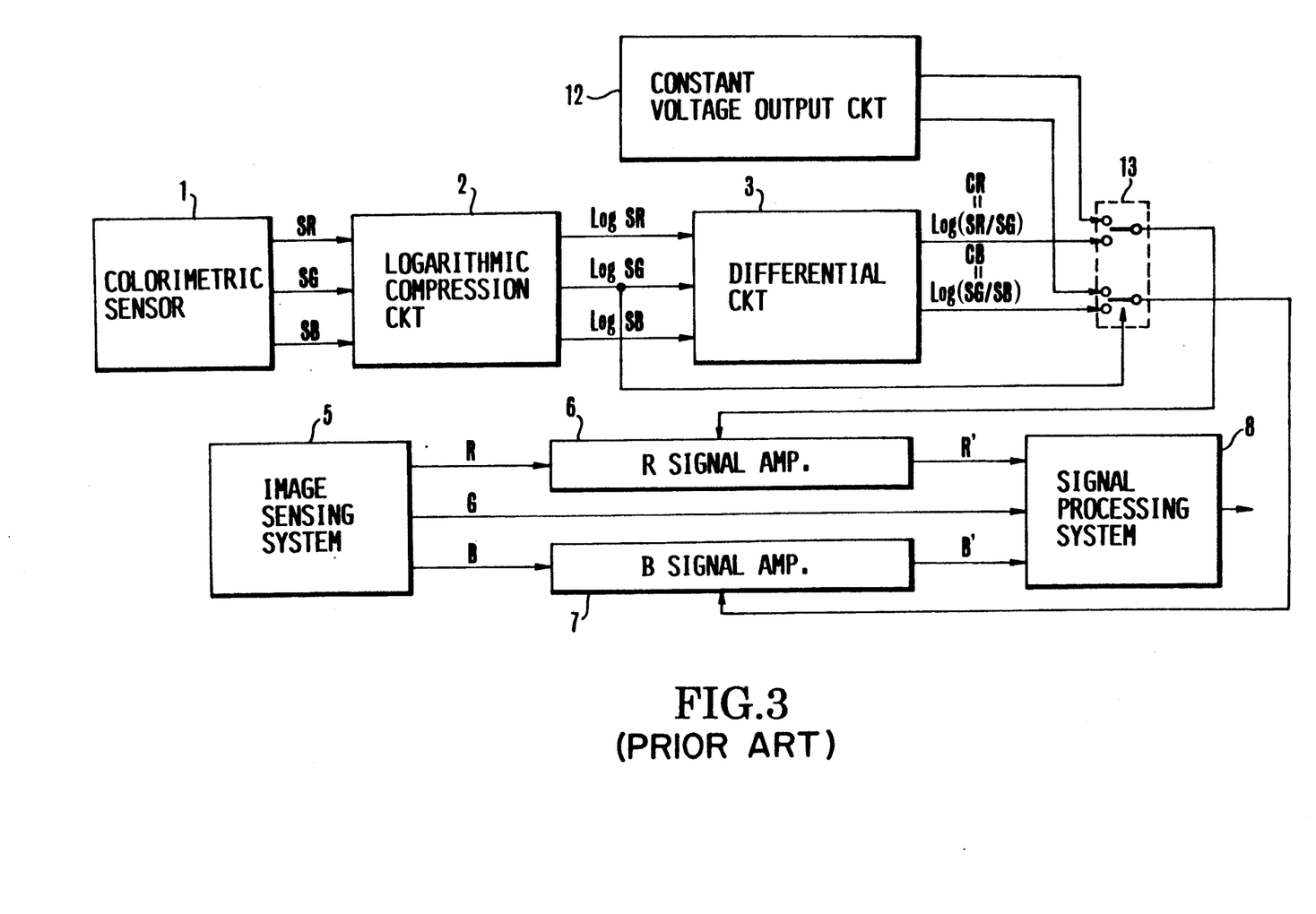
FIG. 3 is a block diagram showing the conventional white balance adjustment device.

FIG. 3 of the accompanying drawings shows in a block diagram the arrangement of the conventional white balance adjustment device. Referring to FIG. 3, a colorimetric sensor 1 is arranged to detect the red, green and blue components of the light of a light source and to perform photo-electric conversion. A logarithmic compression circuit 2 is arranged to logarithmically compress the red, green and blue components of the light of the light source obtained by the colorimetric sensor 1. A differential circuit 3 is arranged to perform a subtracting operation on the outputs of the logarithmic compression circuit 2. An image sensing system 5 is arranged to photo-electrically convert the light of an object to be photographed and produces red (R), green (G) and blue (B) signal outputs. An R signal amplifier 6 and a B signal amplifier 7 are arranged to amplify the R and B signal outputs of the image sensing system 5 respectively. A signal processing system 8 is arranged to perform a signal processing action to obtain a predetermined signal. A constant voltage output circuit 12 is arranged to produce a constant voltage for controlling the R signal amplifier 6 and the B signal amplifier 7 by applying it to them in place of the outputs of the colorimetric sensor 1 when the light incident on the colorimetric sensor 1 is insufficient. A switch 13 is arranged to switch the supply of the outputs of the colorimetric sensor 1 over to the outputs of the constant voltage output circuit 12 and vice versa.

In the device of FIG. 3, the colorimetric sensor 1 produces signals SR, SG and SB which respectively correspond to the red, green and blue components of the light of the light source. The signals SR, SG and SB are logarithmically compressed by the logarithmic compression circuit 2. The circuit 2 produces outputs log SR, log SG and log SB, which are supplied to the differential circuit 3. The differential circuit 3 obtains a difference between the logarithmic values of R (red) and G (green) and a difference between those of B (blue) and G. The differential circuit 3 converts these differences into outputs log (SR/SG) and log (SG/SB) which are control voltages for the R signal amplifier 6 and the B signal amplifier 7. The amplifiers 6 and 7 perform white balance adjustment by amplifying the sensed image signals output from the image sensing system 5 according to the above-stated control voltages.

In this instance, if the illuminance of the ambient light is low, the error components of the outputs of the colorimetric sensor 1 and the logarightmic compression circuit 2 are amplified. As a result, the white balance adjustment becomes inadequate. In view of this, the conventional device such as the one shown in FIG. 3 is arranged to detect the value log SG as the illuminance of the ambient light. When the detection output log SG is lower than a given reference level, the control is performed by switching the control voltages obtained from the colorimetric sensor 1, the logarithmic compression circuit 2 and the differential circuit 3 over to the outputs of the constant voltage output circuit 12 by means of the switch 13. In this case, the constant voltage output is set at a value corresponding to light of a low color temperature (which corresponds to candle or tungsten light). It has been thus attempted to prevent the white balance adjustment from becoming excessively inadequate by the above-stated arrangement in the event of low illuminance.

In accordance with the conventional white balance adjustment device, therefore, the control voltage is fixed to the constant voltage output when the ambient light illuminance detection output becomes lower than a given value and the constant voltage is switched over back to the control voltage when the illuminance level of the ambient light comes to exceed the given value. As a result, the white balance tends to greatly change at the above-stated given value. This makes an uncomfortable picture. Particularly, in a case where the ambient light is widely different from a color temperature defined by the constant voltage, a very large change in white balance occurs conspicuously. Further, such change also tends to occur under a flickering light source such as a fluorescent lamp.

Further, in the apparatus of the above-stated kind, white balance correction control is automatically performed on the basis of information on the image of an object obtained through a lens. Then, in cases where there is no completely white part in the object or where a background occupying a large area is of a uniform color other than white, if the white balance control is performed on the basis of the value of a high luminance part of the object or an average value of the video (chrominance) signal of the whole image, a signal for a part which is not white would be controlled in such a way as to show the part as a white part when the object's image is displayed on a monitor. Therefore, the white balance within the picture plane of the monitor would be lost.

To solve this problem, for example, a table showing a white balance correcting (or control) range may be stored in a white balance controlling microcomputer. The white balance then may be controlled within a correcting range limited by the table. In accordance with this method, the white balance can be effectively controlled, by narrowing the correcting range mostly for magenta and green colors, for an object having no white part and a background of a uniform color other than white, which are difficult for automatic white balance control by the (TTL) method as mentioned above.

However, since the white balance is controlled within the limited correction range, the image sensing apparatus of the above-stated kind has been incapable of adequately controlling the white balance for all the color temperatures of objects, for example, in cases where the object to be photographed is white in a large portion thereof or where the white balance is completely adjusted with a standard white plate or the like before an image sensing operation.

SUMMARY OF THE INVENTION

This invention is directed to the solution of the above-stated problems of the prior art. It is therefore an object of the invention to reduce the frequency of white balance variations.

It is another object of the invention to provide an image sensing apparatus which is capable of perfectly controlling the white balance for all the color temperatures of objects to be photographed.

To attain the above-stated object, an image sensing apparatus arranged according to this invention as an embodiment thereof comprises: image sensing means for converting light of an object to be photographed into an electrical signal; amplifying means for amplifying the electrical signal output from the image sensing means; control voltage limiting means for limiting a range of a control voltage to be output to the amplifying means; and light quantity detecting means for detecting a quantity of ambient light with a hysteresis characteristic. The limited range of the control voltage is arranged to be variable on the basis of an output of the light quantity detecting means.

The embodiment which is arranged as described above is capable of appositely performing white balance adjustment even in the event of a low illuminance, so that the possibility of having disagreeable color variations can be lessened to a great extent.

An image sensing apparatus which is arranged as another embodiment of the invention has a limiting mode in which white balance control is performed with a white balance correction range limited for each color temperature of an object to be photographed and a fixing mode in which white balance control is performed in a fixed manner. In the fixing mode, the white balance is fixedly controlled irrespectively of the above-stated limited correction range.

In the fixing mode, the image sensing apparatus according to the invention thus performs the white balance control irrespectively of the limited correction range. Therefore, the apparatus is capable of completely performing white balance control over all the color temperatures of the object to be photographed.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
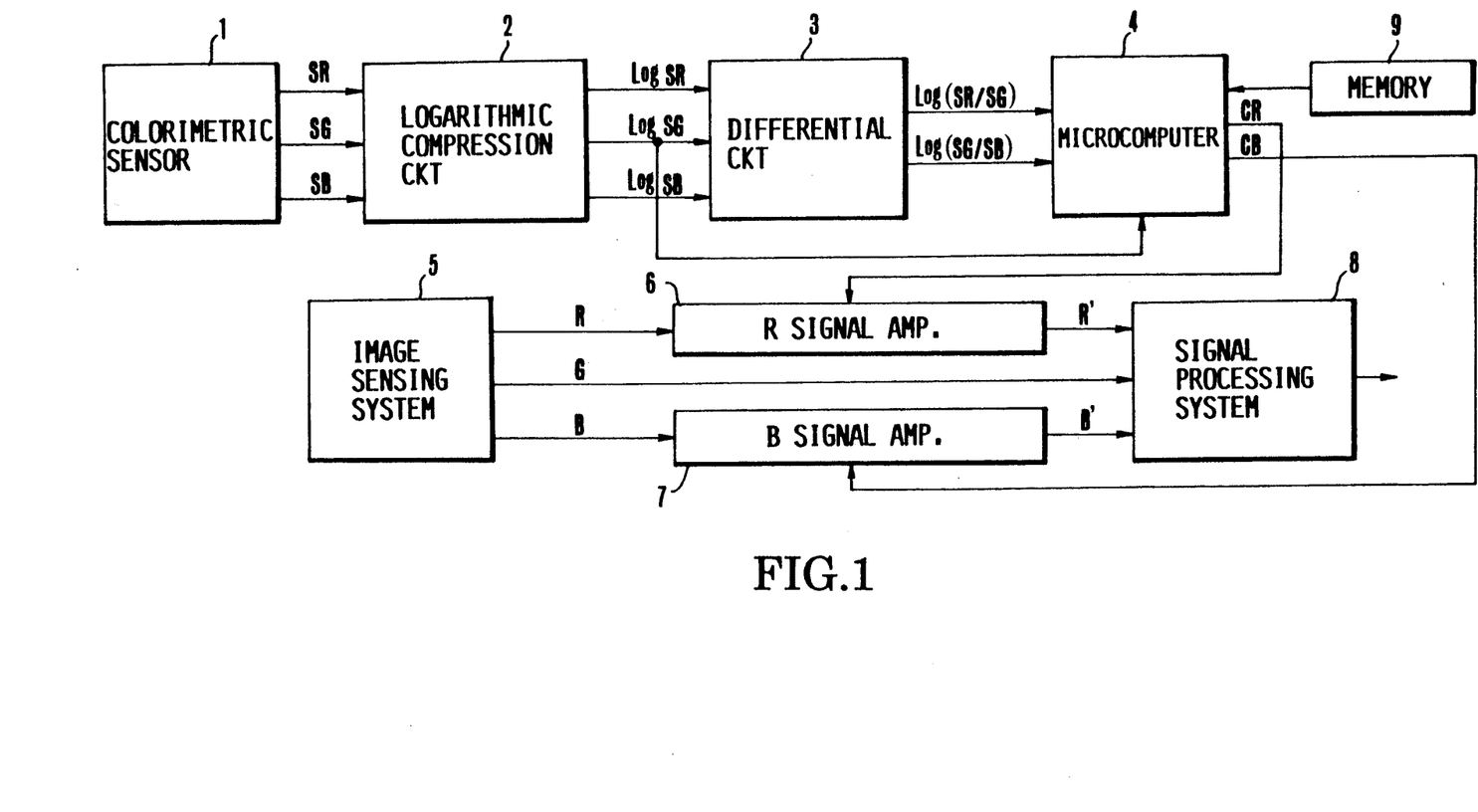
FIG. 1 is a block diagram showing a white balance adjustment device which is arranged according to the invention as a first embodiment thereof.
Figure 4:
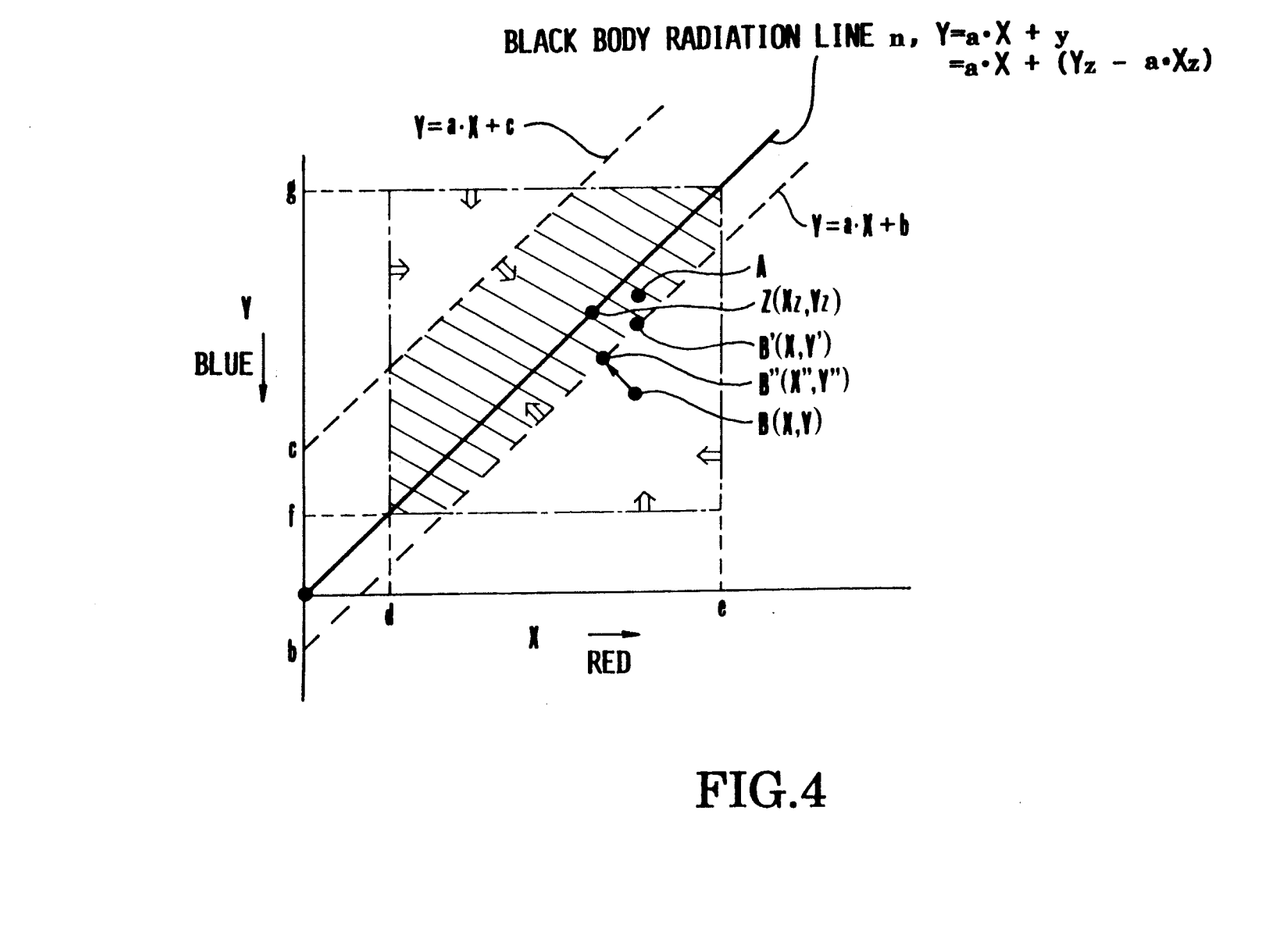
FIG. 4 is a diagram showing a control voltage limitation in the first embodiment shown in FIG. 1.
Figure 5:
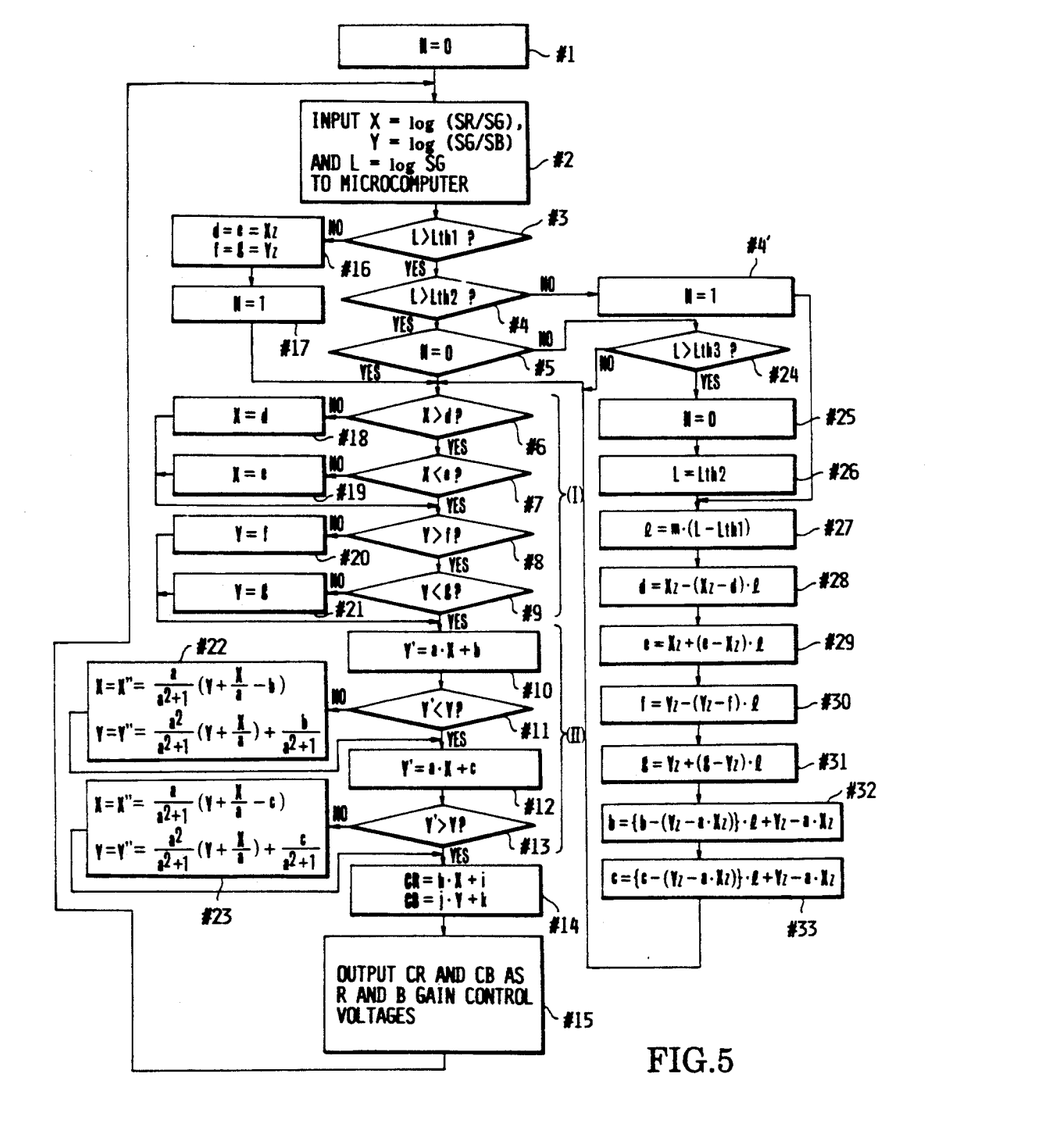
FIG. 5 is a flow chart showing the operation of the first embodiment.

FIG. 1 is a block diagram showing a white balance adjustment device which is arranged as a first embodiment of the invention. FIG. 4 is a graph showing a control voltage limitation to explain the first embodiment shown in FIG. 1. FIG. 5 is a flow chart showing the operation of the first embodiment.

Referring to FIG. 1, a microcomputer 4 is arranged to produce gain control voltages from the outputs of a differential circuit 3. A memory 9 is arranged to store constants required for a computing operation to be performed by the microcomputer 4. The parts of the first embodiment which are the same as or equivalent to the parts of the conventional device shown in FIG. 3 are indicated by the same reference numerals.

The first embodiment is arranged to operate as described below with reference to FIGS. 1, 4 and 5:

The values SR, SG and SB of the R, G and B components of the light of a light source are obtained by a colorimetric sensor 1 in the same manner as in the case of the device of FIG. 3. These values are logarithmically compressed by a logarithmic compression circuit 2. The differential circuit 3 obtains differences between values log SR and log SG and between values log SB and log SG to produce outputs log (SR/SG) and log (SG/SB). These outputs log (SR/SG), log (SG/SB) and log SG are supplied to the microcomputer 4. The microcomputer 4 then produces control voltages required for adequate white balance correction to be made by an R signal amplifier 6 and a B signal amplifier 7. The control voltages are produced in a manner as shown in the flow chart of FIG. 5.

Referring to FIG. 5, at a step #1, an initial value is set as N =0. At a step #2: The values log (SR/RG), log (SG/SB) and log SG which have been supplied to the microcomputer 4 are converted by an A/D converter within the microcomputer 4 into digital signals to be read as data X, Y and L. At a step #3: The data L is compared with a first threshold reference value Lth1 of brightness stored in the memory 9. In this instance, the data L is directly proportional to a logarithm of the light quantity value of the ambient light. If the ambient light is brighter than the brightness represented by the first threshold reference value Lth1, the data L is larger than the value Lth1. In this case, the flow proceeds to a step #4. At the step #4: The data L is compared with a second threshold reference value Lth2, which corresponds to a brighter light than the first threshold reference value Lth1.

The value Lth2 corresponds to a brightness degree at which a low-brightness correction in the white balance control begins. The value Lth1 corresponds to a brightness degree at which the low-brightness correction in the white balance control is most extremely performed. No correction will be made for a brightness lower than the brightness represented by the value Lth1.

If the data L is larger than both the values Lth1 and Lth2, the flow proceeds to a step #5. At the step #5: A check is made for N=0, which indicates a brightness not requiring the low-brightness correction. If so, the flow proceeds to a step #6. At the step #6: The data X is compared with a lower limit value "d" which is set for the data X. If the data X is found to be equal or less than the value "d", the flow comes to a step #18. At the step #18: The data X is set as X =d. If the data X is found at the step #6 to be larger than the value "d", the data X is left as it is. Next, the flow proceeds to a step #7. At the step #7: The data X is compared with an upper limit value "e" which is set for the data X. If the data X is found to be equal or larger than the upper limit value "e", the flow comes to a step #19. At the step #19: The data X is set as X = e. If the data X is found to be less than the upper limit value "e" at the step #7, the data X is left as it is. (The values "d" and "e" are as shown in FIG. 4.) The data Y is also likewise processed.

At steps #8 and #9: The data Y is compared with values "f" and "g". If the data Y is found to be equal or less than the value "f" and equal or larger than the value "g" ("g" is larger than "f"), the data Y is set as Y = f at a step #20 and as Y = g at a step #21. If the data Y is found to be larger than the value "f" and is less than the value "g", the data Y is left as it is. As described above, by these steps of the routine (I) of the flow of FIG. 5, the data X and Y can be limited within a range defined by one-dot-chain lines as shown in FIG. 4.

Next, at a step #10: A value Y' is obtained by performing a computing operation of (a X + b). At a step #11: The value Y' is compared with the data Y. In other words, they are compared to find whether the value Y of the coordinates of the point in FIG. 4 is located above or below a straight line (Y = a·X·b). Referring to FIG. 4, a point A is above the straight line (Y = a·X·b) thus indicating that the value Y' is less than the data Y. In that case, the coordinates of the point A, A (X, Y), are left as they are. Meanwhile, a point B is located below the straight line (Y = a·X·b). This indicates that the value Y' is larger than the data Y (the step #11). Then, the flow comes to a step #22. At the step #22: The values X and Y at the point B (X, Y) are set at values $X = X'' = (a / (a^2 + 1))(Y + X/a - b)$ and $Y = Y'' = (a^2/(a^2.1))(Y + X/a) + b/(a^2.1)$. Then, the point B is shifted to a point B'' (X'', Y''). In this case, if the point B is shifted to a point B', i.e., B' (X, Y'), the shift would deviate from a shift perpendicular to a straight line "n" which indicates a color change of a black body radiation light. Such deviation causes a great error in the white balance adjustment. Whereas, the shift to the point B'' is perpendicular to the straight line "n". Therefore, the adverse effect of an object's color alone can be removed without causing any error in the white balance adjustment.

Next, at a step #12: A computing operation of (a·X + c) ("c" is larger than "b") is performed to obtain a value which is used as Y'. At a step #13: The value Y' is compared with the data Y. In other words, referring again to FIG. 4, a check is made to see if the value Y of the coordinates of the point is above or below a line (Y = a·X + c). If the value Y' is larger than the data Y, that data Y is left as it is. If the value Y' is equal to or less than the data Y, the flow comes to a step #23. At the step #23: The values X and Y obtained at the point B (X, Y) are changed to $X = X'' = (a / (a^2.1))(Y + X/a - c)$ and $Y = Y'' = (a^2/(a^2 + 1)(Y + X/a) + c/(a^2 + 1)$ respectively. The data X and Y thus can be limited and confined to a hatched part of FIG. 4 by the routines (I) and (II) of FIG. 5. The white balance adjustment can be accomplished without being much affected by the color of the object by virtue of the limitation described. Further, the limiting range is arranged to be broader for an area having stronger green color than the black body radiation light of a straight line "n" (an upper left part of the straight line "n" of FIG. 4). With the embodiment arranged in this manner, the white balance can be correctly accomplished even for a light source which is strong for a green color like a fluorescent lamp.

Next, in a case where the brightness represented by the data L (L: log SG) is larger than the first threshold value Lth1 and is less than the second threshold value Lth2, the flow comes to a step #4'. At the step #4': The value N is set at "1". Then, the flow comes to a step #27. At the step #27: A value l is obtained by performing a computing operation of (m·(L − Lth1)) using a constant "m" stored in the memory. The constant "m" is set at (1/ (Lth2 − Lth1)) to have the value l at "0" if the data L is equal to the first threshold value Lth1 and at "1" if the data L is equal to the second threshold value Lth2. Further, the memory stores a value Z (Xz, Yz) for the converging point which represents the value X and Y when it becomes very dark and the data L becomes equal to the value Lth1. In that instance, the flow comes to steps #28, #29, #30 and #31 to have the following computing operations performed by using the values Xz, Yz and l:

$$d = Xz - (Xz - d) \cdot l$$

$$e = Xz + (e - Xz) \cdot l$$

$$f = Yz - (Yz - f) \cdot l$$

$$g = Yz + (g - Yz) \cdot l$$

Further, since the straight line "n" is at an inclination "a", the intercept "y" thereof can be expressed as follows:

$$Yz = a \cdot Xz + y$$

Therefore: $y = Yz - a \cdot Xz$

Accordingly, the straight line "n" can be expressed with "a", Xz and Yz as follows:
$$Y = a \cdot X + (Yz - a \cdot Xz)$$

At steps #32 and #33: The segments "b" and "c" of straight lines (Y = a·X + b) and (Y = a·X + c) can be computed respectively with Xz, Yz and l as follows:
$$b = \{b - (Yz - a \cdot Xz)\} \cdot l + Yz - a \cdot Xz$$

$$c = \{c - (Yz - a\,Xz)\} \cdot l + Yz - a \cdot Xz$$

The ranges of the data X and Y are limited on the basis of these constants computed as shown above in the same manner as when the data L is larger than both the first and second threshold values Lth1 and Lth2. Then, the limiting range becomes narrower accordingly as the value l comes closer to "0" with the light becoming darker (as indicated by arrow marks of FIG. 4). When the value l becomes "0", the data X becomes equal to Xz and the data Y equal to Yz. Then, the flow comes to the step #6.

In a case where the brightness represented by the data L (L: log SG) is found to be darker than the first threshold value Lth1 at the step #3, the flow comes to a step #16 to obtain d = e = Xz and f = g = Yz. Then, the data X and Y are only at the values Xz and Yz. The flow then proceeds to a step #17 to set the value N at "1". After the step #17, the flow comes to the step #6. The first and second threshold values Lth1 and Lth2 are set according to the specifications of the image sensing apparatus. The values Xz and Yz are determined according to a light source to be employed under the darkest condition.

By using the data X and Y thus obtained, the flow comes to a step #14. At the step #14: Control voltages CR and CB are obtained by computations which are performed according to formulas: $CR = h \cdot X + i$, and $CB = j \cdot Y + k$. At a step #15: The control voltages CR and CB are supplied from a D/A converter disposed within the microcomputer 4 to the R signal amplifier 6 and the B signal amplifier 7. White balance adjustment is thus performed. After the step #15, the flow comes back to the step #2. Then, at the step #2, the data X, Y and L are input and the ensuing steps are executed in the same manner as described above, with the exception of the following:

In a case where the value N is not equal to "0" at the step #5, the flow comes to a step #24. At the step #24, the data L is compared with a third threshold value Lth3. If the data L is found to be equal to or less than the value Lth3, the flow comes to the D step #6. If the data L is larger than the value Lth3, the flow proceeds to a step #25 to set the value N at "0". After that, the flow comes to a step #26. At the step #26: The data L is set to be L = Lth2. Then, the flow proceeds to the step #27.

In other words, once the data L has been found to be less than the second threshold value Lth2 and the low-brightness correction has been performed, the control voltage is restricted to the current value as long as the data L does not become larger than the third threshold value Lth3. Then, with the third threshold value Lth3 set to be larger than the second threshold value Lth2, a hysteresis characteristic can be obtained. Further, with the value N written in an E2PROM, the operation of the microcomputer described above will be repeated also for a succeeding image sensing operation even if the power supply of the camera is turned off before the next image sensing operation.

Figure 2:
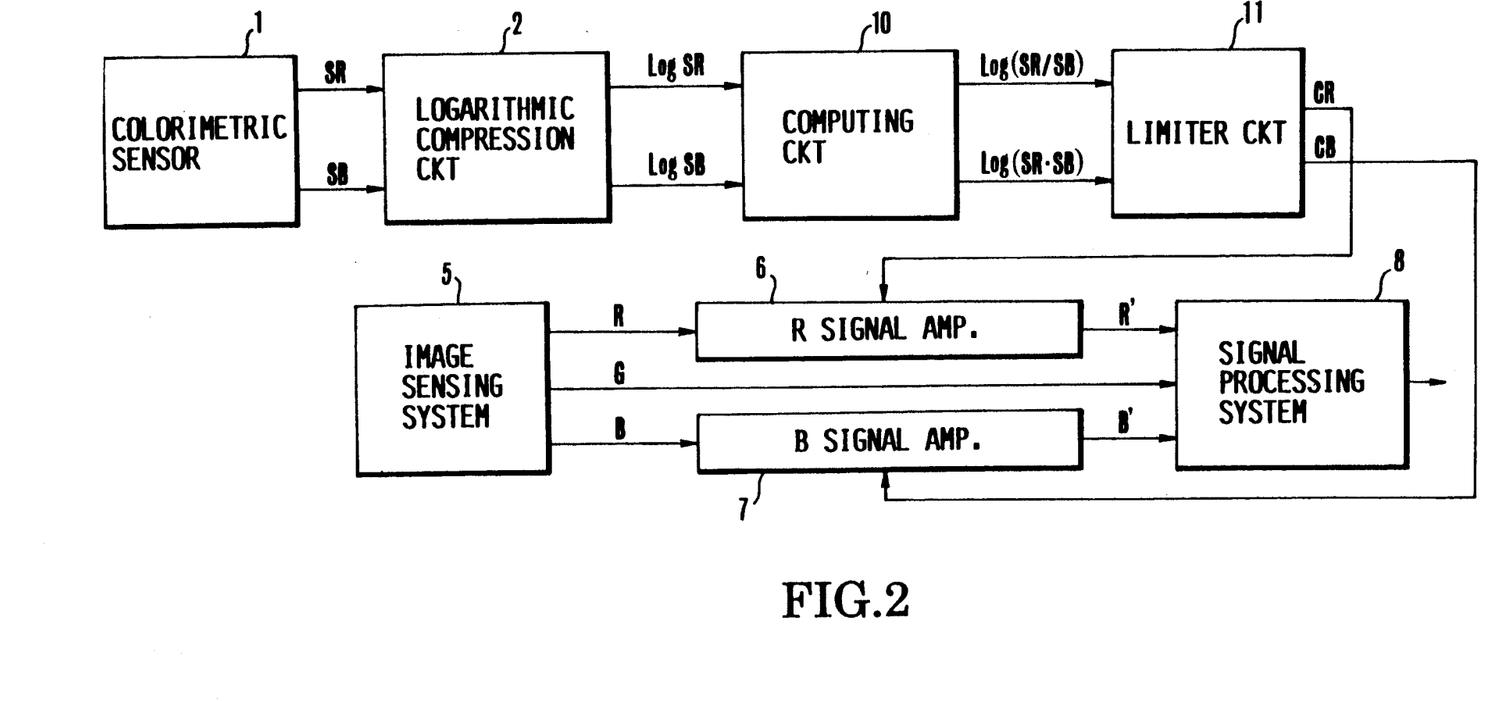
FIG. 2 is a block diagram showing a second embodiment of the invention.

FIG. 2 is a block diagram showing a second embodiment of the invention. The second embodiment is provided with a computing circuit 10 which is arranged to obtain, from the outputs log SR and log SB of the logarithmic compression circuit 2, signals log (SR/SB) and log (SR·SB). A limiter circuit 11 of an analog system is arranged to impose limitation according to the outputs log (SR/SB) and log (SR·SB) of the computing circuit 10. In FIG. 2, the same reference numerals and symbols as those of FIGS. 1 and 3 denote the same or equivalent parts.

Referring to FIG. 2, the colorimetric sensor 1 produces the red component SR and the blue component SB of the light of the light source. The red and blue components are supplied to the logarithmic compression circuit 2 to be logarithmically compressed into signals log SR and log SB. The signals log SR and log SB are supplied to the computing circuit 10. The computing circuit 10 performs subtracting and adding operations to obtain signals log (SR/SB) and log (SR·SB).

Next, with the signal log (SR.SB) used as information on brightness, when the value of this signal is less than a given level L1, the limiter circuit 11 works to limit the value of the signal log (SR/SB). The limiter circuit 11 is arranged to intensify the limitation according to the value of the signal log (SR·SB) and to produce voltages CR and CB for controlling the amplifying degrees of the R signal amplifier 6 and the B signal amplifier 7. Further, the limiter circuit 11 is arranged to have the above-stated threshold level L1 variable. A hysteresis characteristic is obtained by increasing the threshold level L1 for a low brightness condition and by decreasing it for a normal brightness condition.

As apparent from the foregoing description, the first and second embodiments of this invention are capable of performing white balance adjustment without any white balance deviation even under a low brightness condition and are also capable of preventing colors from being changed by variations taking place in the white balance. It is a particularly salient advantage of the embodiments that they can prevent the adverse effect of flickers taking place under a fluorescent lamp.

Figure 6:
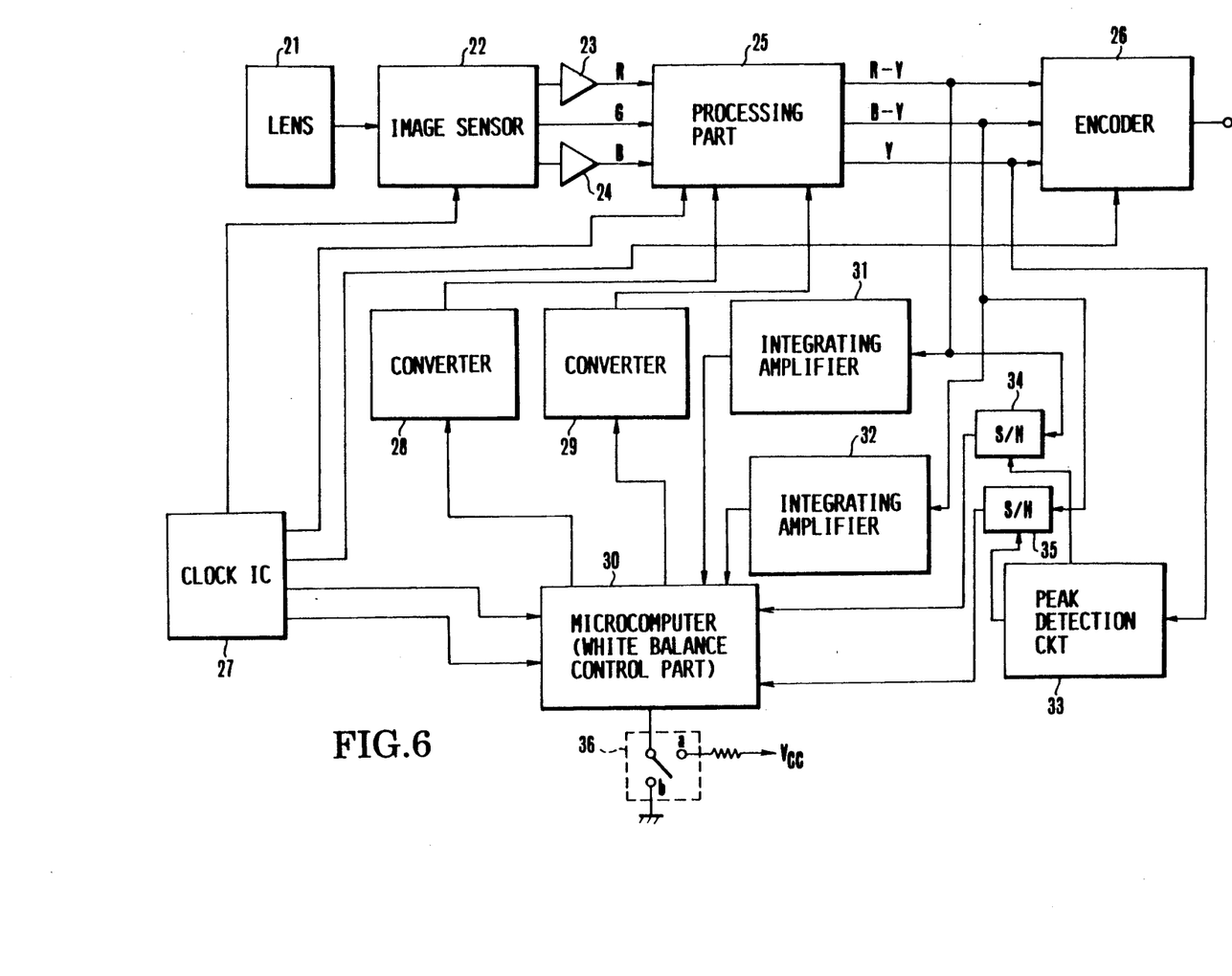
FIG. 6 is a block diagram showing the arrangement of an image sensing apparatus arranged according to the invention as a third embodiment thereof.

A third embodiment of this invention is arranged as described below with reference to FIGS. 6 to 9:

FIG. 6 is a block diagram showing the essential parts of a color image sensing apparatus which is arranged as the third embodiment of the invention. This apparatus performs white balance control of the automatic tracking type using the TTL method.

Referring to FIG. 6, a lens 21 is arranged to have incident light thereon bearing the image of an object to be photographed. An image sensor 22 is arranged to convert the incident light into electrical signals and may be selected from among many elements such as a CCD, a MOS type element, a tube type element, etc. Amplifiers 23 and 24 are arranged to amplify the signals output from the image sensor 22. In this case, signals for red (R) and blue (B) of the three primary colors are arranged to be amplified. A processing part 25 is arranged to receive signals for the three primary colors, red (R), green (G) and blue (B), and to produce color-difference signals R-Y and B-Y and a luminance signal Y. An encoder 26 is arranged to form a video signal on the basis of the signals R-Y, B-Y and Y and to supply the video signal to a monitor which is not shown. A clock IC 27 is arranged to produce and supply clock pulse signals for driving the CCD and controlling the signal processing to applicable parts. Converters 28 and 29 are arranged to convert R and B gain control signals output from a microcomputer 30 for white balance control into a signal form acceptable by the processing part 25. The microcomputer 30 is arranged to process the signals R-Y, B-Y and Y and to produce the above-stated gain control signals as a result of the processing operation. The gains of the outputs of the amplifiers 23 and 24 are controlled by the gain control signals. Integrating amplifiers 31 and 32 are arranged to integrate and amplify the signals R-Y and B-Y output from the processing part 25 and to supply these signals to the microcomputer 30. A peak detection circuit 33 is arranged to detect the peak value of the signal Y. Sample-and-hold circuits 34 and 35 are arranged to sample and hold the values of the signals R-Y and B-Y according to a signal output from the peak detection circuit 33 and to supply their outputs to the microcomputer 30. A mode selection switch 36 is arranged to switch the white balance control from a limiting mode over to a fixing mode and vice versa.

The microcomputer 30 forms a white balance control part. The white balance is controlled by automatically correcting it. The white balance control is performed either in the limiting mode or in the fixing mode. In the limiting mode, the white balance correction control range is limited for each color temperature of the object to be photographed. The white balance correcting values are stored in the form of a table at a memory disposed within the microcomputer 30. In the fixing mode, a white cap or a sheet of white paper or the like is used to completely obtain white balance at every color temperature and the white balance is thus fixedly controlled. When the fixing mode is selected, the white balance is fixedly controlled by using correcting values up to the control limit of the microcomputer 30 irrespectively of the above-stated limited range. The third embodiment operates as follows:

When an object's image light comes through the lens 21 to fall on the light receiving surface of the image sensor 22, the color signals R, G and B are output from the image sensor 22 in synchronism with the above-stated clock pulse signal. The signals R, G and B are supplied to the processing part 25. Then, the processing part 25 forms the color-difference signals R-Y and B-Y and the luminance signal Y as mentioned above. The signals R-Y, B-Y and Y are supplied to the encoder 26. The encoder 26 modulates the signals R-Y and B-Y according to the clock pulse signal. The modulated signals R-Y and B-Y are mixed with the signal Y into a video signal. The video signal is output from the encoder 26.

During the process of the signal processing action of the processing part 25, the signals R-Y an B-Y which are output from the processing part 25 are integrated and amplified as mentioned above and are supplied to the microcomputer 30. Meanwhile, the signal Y is supplied to the peak detection circuit 33. The peak detection circuit 33 detects a part of the signal Y which is at a level higher than a threshold level as a peak value and produces a detection pulse. The detection pulse is supplied to the sample-and-hold circuits 34 and 35. The sample-and-hold circuits 34 and 35 read out the levels of the signals R-Y and B-Y obtained when the above-stated peak value is detected. Information on the levels of the signals R-Y and B-Y thus read out is supplied to the microcomputer 30.

The microcomputer 30 which is arranged to perform the white balance control performs the white balance control in the above-stated limiting mode (i.e., a TTL automatic tracking white balance control mode) if the contact piece of the selection switch 36 is in a pull-up state (Vcc) in contact with one terminal "a" thereof. In this instance, the microcomputer 30 reads the integrated color-difference signals from the integrating amplifiers 31 and 32 and the values of the color-difference signals from the sample-and-hold circuits 34 and 35. After that, the microcomputer 30 performs a programmed computing process and produces the R and B gain control signals.

Figure 7:
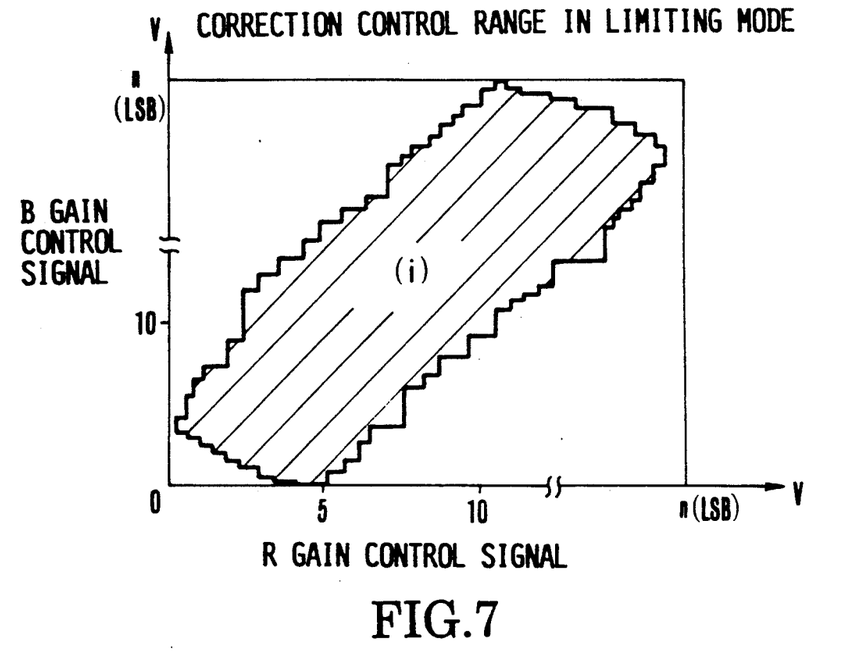
FIG. 7 is an explanatory diagram showing a range obtained in a limiting mode.

FIG. 7 shows the white balance correction control range set for the above-stated limiting mode. In FIG. 7, a part (i) indicated with slanting lines represents the correction control range. Data for this range is stored in a table at the memory of the microcomputer 30. An area $n \times n$ (LSB) represents the threshold control range of the microcomputer 30. The correction control range is confined to a limited area within the threshold control range. The R and B gain control signals which are obtained within this limited correction control range are supplied to the processing part 25 via the converters 28 and 29. By this, feedback control is applied to the signals R and B at the processing part 25 to have the gains of the signals R and B controlled. The levels of the color-difference signals output from the processing part 25 are adjusted accordingly. With the levels of the color-difference signals thus adjusted, the white balance control is carried out accordingly.

Figure 8:
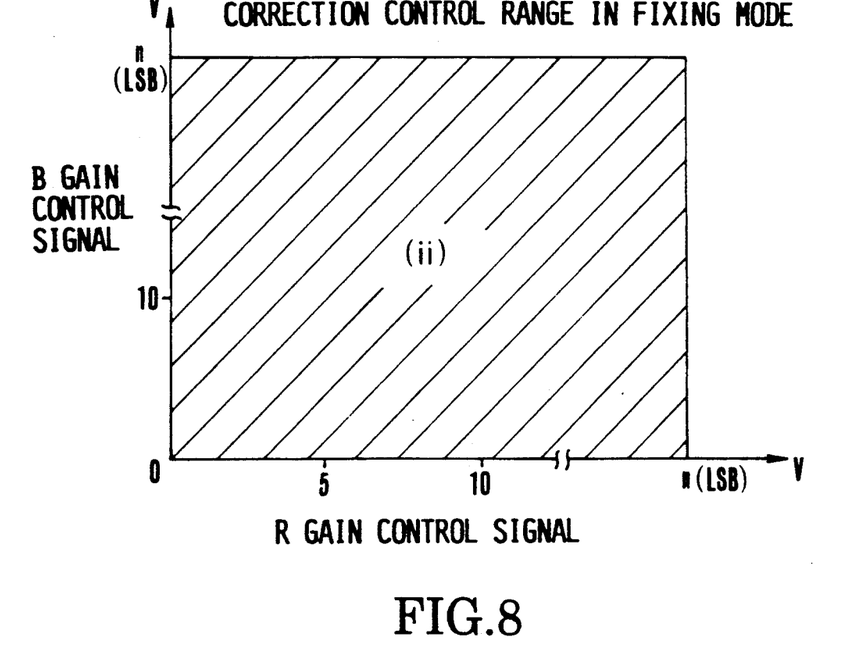
FIG. 8 is an explanatory diagram showing a correcting control range obtained in a fixing mode.

When the contact piece of the selection switch 36 is in a grounding state being in contact with the terminal "b" thereof, the microcomputer 30 performs the white balance control in the fixing mode, in which the white balance obtained by means of a white cap or a sheet of white paper or the like is fixed completely for a color temperature obtained at that time. In that instance, as shown in FIG. 8, the microcomputer 30 performs white balance correction control over the whole area of the above-stated threshold control range $n \times n$ (LSB) as indicated by a symbol (ii). The white balance is completely obtainable for every color temperature irrespectively of the above-stated limited correction control range (i).

As described above, the third embodiment has the limiting mode in which the white balance control of the automatic tracking type using the TTL method is limited; and the fixing mode in which the white balance control is fixed by using a standard white plate or the like. The selection switch 30 makes one of the two modes selectable as desired. Therefore, while optimum white balance control can be accomplished in the limiting mode for every condition of the object, white control can be completely accomplished even for photographing under a wide range of color temperatures by fixing the gain control signals in the fixing mode.

Figure 9:
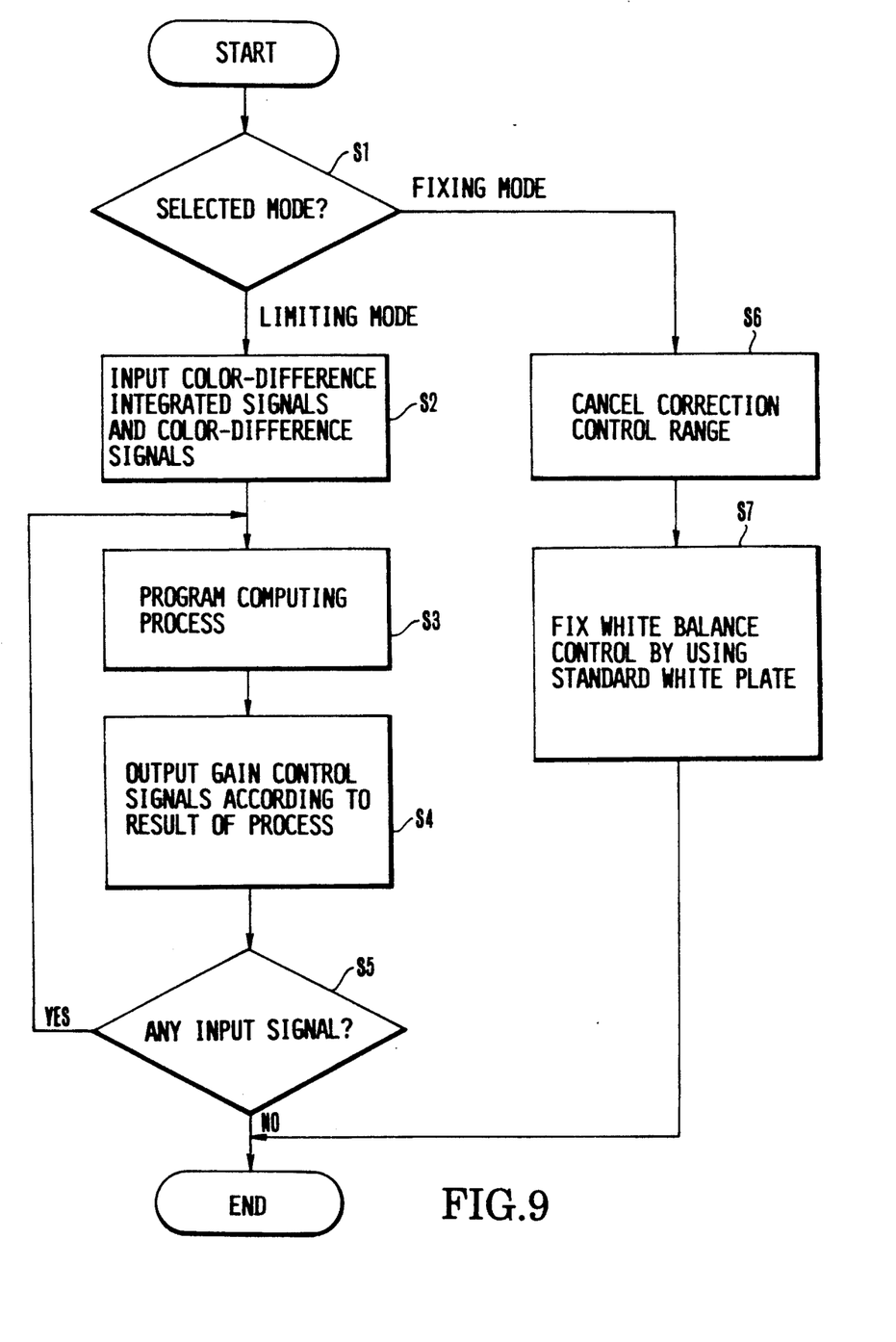
FIG. 9 is a flow chart showing by way of example the white balance control operation of the third embodiment shown in FIG. 6.

FIG. 9 is a flow chart showing by way of example the white balance control operation of the microcomputer 30. At a step S1: A signal from the mode selection switch 36 is checked for the mode selected. If the limiting mode is selected, the flow proceeds to a step S2. At the step S2: The microcomputer 30 inputs color-difference integrated signals from the integrating amplifiers 31 and 32. The microcomputer 30, at the same time, inputs from the sample-and-hold circuits 34 and 35 the color-difference signals obtained when the luminance signal is at its peak level. At a next step S3: The above-stated programmed computing operation is performed with values of these signals. At a step S4: The R and B gain control signals are output according to the result of the computing operation. At a step S5: A check is made for the input of the above-stated signals from the processing part 25. If no signal is received from the processing part 25, the flow of operation comes to an end.

Further, if the selection of the fixing mode is detected at the step S1, the flow of operation comes to a step S6. At the step S6: The limited correction control range obtained in the above-stated limiting mode is canceled. At a step S7: The white balance is obtained by using a standard white plate and the white balance control is fixed.

As described above, the third embodiment has the limiting mode in which the white balance correction control range is limited and a fixing mode in which the white balance control is fixed. In the case of the fixing mode, the white balance control is performed in a fixed manner irrespectively of the limited range set in the limiting mode. These modes enable the third embodiment to appositely perform white balance control under all the conceivable conditions of the object and to completely perform white balance control for every one of different color temperatures.

What is claimed is:

1. A white balance adjustment device comprising:
   a) image sensing means for converting light of an object into an electrical signal;
   b) amplifying means for amplifying the electrical signal output from said image sensing means;

c) control voltage limiting means for limiting ranges of a control voltage to be output to said amplifying means, said limiting means including at least first and second limiting ranges;

d) light quantity detecting means for detecting a quantity of ambient light; and e) control means for changing said limiting ranges from said first range to said second range when said light quantity increases beyond a first level and for changing said limiting range from said second range to said first range when said light quantity decreases below a second level different from said first level.

2. A device according to claim 1, wherein said image sensing means is arranged in combination with a plurality of color filters.

3. A device according to claim 1, wherein said image sensing means is arranged to form a plurality of color signals.

4. A device according to claim 3, wherein said amplifying means includes a plurality of amplification circuits for amplifying the color signals.

5. A device according to claim 1, wherein said control voltage limiting means includes a microcomputer.

6. A device according to claim 1, further comprising color temperature detecting means for detecting a color temperature of ambient light.

7. A device according to claim 6, wherein said color temperature detecting means includes a plurality of color sensors.

8. A device according to claim 7, wherein said light quantity detecting means is arranged to detect a quantity of light by using an output of at least one of said plurality of color sensors.

9. An image sensing apparatus capable of controlling white balance correction, comprising:

control means having a first mode in which white balance control is performed in accordance with a color temperature of an object by limiting a white balance correction range to a predetermined limited range for each color temperature and a second mode in which white balance control is performed irrespectively of said predetermined limited range, and selecting means for selecting said first mode or said second mode.

10. An apparatus according to claim 9, wherein said selecting means includes switching means for selection of said first mode or said second mode.

11. An apparatus according to claim 10, wherein said switching means is manually operable.

* * * * *

UNITED STATES PATENT AND TRADEMARK OFFICE
CERTIFICATE OF CORRECTION

PATENT NO. : 5,283,635

DATED : February 1, 1994

INVENTOR(S) : Masao Suzuki

It is certified that error appears in the above-indentified patent and that said Letters Patent is hereby corrected as shown below:

Col. 3, line 62. After "a", insert -- correcting control --

Col. 5, line 21. Change "(aX+b)" to --(a·x + b)--.

Col. 5, lines 25, 26 and 30. Change "(Y=a.X.b)" to -- (Y=a.X+b) --

Col. 5, line 35. Change "$(a^2/(a^2.1))$" to -- $(a^2/(a^2+1))$ -- and change "$(a^2.1)$" to -- $(a^2+1))$ --

Col. 5, line 57. Change "$(a^2.1))$" to -- $(a^2+1))$" --

UNITED STATES PATENT AND TRADEMARK OFFICE
CERTIFICATE OF CORRECTION

PATENT NO. : 5,283,635
DATED : February 1, 1994
INVENTOR(S) : Masao Suzuki

It is certified that error appears in the above-indentified patent and that said Letters Patent is hereby corrected as shown below:

Col. 6, lines 8, 11. Change "1" to -- $\lambda$ --

Col. 6, lines 22, 24, 26 and 28. Change "1" to -- $\lambda$ --

Col. 6, lines 44, 45 and 46. Change "1" to -- $\lambda$ --

Col. 6, lines 54, 56, Change "1" to -- $\lambda$ --

Col. 7, line 20. Delete "D"

Signed and Sealed this

Twelfth Day of July, 1994

Attest:

BRUCE LEHMAN

Attesting Officer     Commissioner of Patents and Trademarks